United States Patent
Entin et al.

(10) Patent No.: US 9,593,868 B2
(45) Date of Patent: Mar. 14, 2017

(54) HORIZONTAL GROUND-COUPLED HEAT EXCHANGER FOR GEOTHERMAL SYSTEMS

(71) Applicants: Vladimir Entin, Reston, VA (US); Vladimir Kominar, Kfar Sava (IL); Irina Loktev, Jerusalem (IL)

(72) Inventors: Vladimir Entin, Reston, VA (US); Vladimir Kominar, Kfar Sava (IL); Irina Loktev, Jerusalem (IL)

( * ) Notice: Subject to any disclaimer, the term of this patent is extended or adjusted under 35 U.S.C. 154(b) by 0 days.

(21) Appl. No.: 14/627,707

(22) Filed: Feb. 20, 2015

(65) Prior Publication Data

US 2016/0245551 A1  Aug. 25, 2016

(51) Int. Cl.
*F24J 3/08* (2006.01)
*F24F 5/00* (2006.01)

(52) U.S. Cl.
CPC ....... *F24J 3/082* (2013.01); *F24F 2005/0057* (2013.01); *F24J 2003/087* (2013.01)

(58) Field of Classification Search
CPC ...... F24J 3/08; F24J 3/081; F24J 3/082; F24J 3/083; F24J 3/084; F24J 2003/087; F24J 2003/088; F24J 2003/089; F24F 5/0046; F24F 5/005; F24F 2005/0057; Y02B 10/40
USPC .............................................. 165/45; 62/260
See application file for complete search history.

(56) References Cited

U.S. PATENT DOCUMENTS

| 4,042,012 | A | * | 8/1977 | Perry | ....................... F24J 3/081 165/45 |
| 4,257,239 | A | * | 3/1981 | Partin | ....................... F24J 3/081 165/45 |
| 4,466,256 | A | | 8/1984 | MacCracken | |
| 6,251,179 | B1 | | 6/2001 | Allan | |
| 7,370,488 | B2 | | 5/2008 | Kidwell et al. | |

(Continued)

FOREIGN PATENT DOCUMENTS

EP 2418439 2/2012
WO WO2010144073 12/2010

OTHER PUBLICATIONS

Soil Temperature Changes with Time and Depth, Theory, D.L. Nofziger http://soilphysics.okstate.edu/software/SoilTemperature/document.pdf.

(Continued)

*Primary Examiner* — Len Tran
*Assistant Examiner* — Hans Weiland
(74) *Attorney, Agent, or Firm* — JMB Davis Ben-David (57) ABSTRACT

A horizontal ground-coupled heat exchanger for a geothermal system. The underground portion of the system includes; at least one conduit located in the soil below its frost line containing a heat transfer liquid; at least one stratum between the at least one conduit and the soil, totally disposed beneath the surface of the soil at a depth from the surface of the soil of 1.2-3 m and completely separated from the soil by at least two layers of a thin thermo-conductive waterproof material, the at least one stratum containing heat conductive water saturated fill material with the at least one conduit being disposed therein; and a means to compensate for small leaks of water from the at least one stratum. The size of the smallest dimension of the stratum per conduit is determined; the sizing is based on a user selected stratum efficiency parameter employing a relation provided herein.

18 Claims, 5 Drawing Sheets

(56) References Cited

U.S. PATENT DOCUMENTS

| | | | |
|---|---|---|---|
| 7,856,839 B2 | 12/2010 | Wiggs | |
| 7,938,904 B1 | 5/2011 | Wiggs | |
| 7,942,015 B2 | 5/2011 | Hart | |
| 9,443,043 B1 | 9/2016 | Koop | |
| 2007/0056304 A1* | 3/2007 | Everett | F24J 3/081 62/260 |
| 2011/0308268 A1 | 12/2011 | Krimsky | |
| 2013/0081780 A1* | 4/2013 | Alrashidi | F24J 3/082 165/45 |
| 2014/0150175 A1* | 6/2014 | Hekster | F24H 1/0072 4/597 |

OTHER PUBLICATIONS

Thermal Energy Storage in Sweden and Denmark Michael Harris, IIIEE, Lund University, Sweden, Sep. 2011 http://lup.lub.lu.se/luur/download?func=downloadFlle&recordOld=2174449&fileOld=2174452.

Soil-Water Pit Heat Store With Direct Charging System F. Ochs, W. Heidemann, H. Muller-Steinhagen, H. Koch https://intraweb.stockton.edu/eyos/energy studies/content/does/FINAL PAPERS/13A-2.pdf).

The Engineering ToolBox, Thermal Conductivity of some common Materials and Gases http://www.engineeringtoolbox.com/thermal-conductivity-d 429.html.

Ground Temperatures as a Function of Location, Season and Depth http://www.builditsolar.com/Projects/Cooling/EarthTemperatures.htm.

Determination of the thermal conductivity of sands under varying moisture, drainage/wetting, and porosity conditions—applications in near-surface soil moisture distribution analysis Kathleen M. Smits , et. al http://hydrologydays.colostate.edu/papers 2009/smits paperpdf.

Domestic Ground Heat Pumps: Design and installation of closed-loop system http://www.icax.co.uk/pdf/Domestic Ground Source Heat Pumps Design Installation. pdf.

Experimental measurement and numerical simulation of horizontal-coupled slinky ground source heat exchangers Yupeng Wu, et. al Applied Thermal Engineering 30 (2010) 2574-2583.

John W. Lung, Derek H. Freeston, Tonya L. Boyd. Direct utilization of geothermal energy 2010 Worldwide review, Geothermics, vol. 40, N 3, pp. 159-180. https://www.geothermal-energy.org/pdf/IGAstandard/WGC/2010/0007.pdf.

Guide to Geothermal Heat Pumps, http://energy.gov/sites/prod/files/guide to_geothermal_heat_pumps.pdf.

Geothermal Heat Pump Basics, http://energy.gov/eere/enegybasics/articles/geothermal-heat-pump-basics.

S.A. M. Said, M.A. Habib, E.M.A. Mokheimer, N. Al-Shayea and M. Sharqawi, Horizontal Ground Heat Exchanger Design for Ground-Coupled Heat Pumps http://citeseerx.ist.psu.edu/viewdoc/download?doi=1 0.1.1.556.849&rep=rep1&type=pdf.

Research on Ground Source Heat Pump Design, Amanda Jo Pertzborn, Gregory Nellis, Sanford Klein, International Refrigeration and Air Conditioning Conference, 2010, Purdue University http://docs.lib.purdue.edu/cgi/viewcontent.cgi?article=2047&context=iracc.

Determination of soil temperature in an and region, Z. Gao,_, L. Bian, Y. Hu, L. Wang, J. Fan, Journal of Arid Environments 71 (2007) 157-168 http://www.sciencedirect.com/science/article/pii/S014019630700081X.

Thermal properties of rocks by Eugene C. Robertson htts://pubs.usgs.gov/of/1988/0441 /report.pdf.

* cited by examiner

HORIZONTAL GROUND-COUPLED HEAT EXCHANGER FOR GEOTHERMAL SYSTEMS

FIELD OF THE INVENTION

The present invention relates to a field of geothermal heating/cooling systems for buildings, industry, agriculture, greenhouses, etc. In particular, the present invention describes structures of horizontal ground-coupled closed-loops heat exchanger with high effective heat energy transmitting with use of Earth source. Proposed structure considerably increases productivity of horizontal ground exchangers and decreases the required land area used for geothermal systems and makes minimal power dependence on drought, daily and seasonal variation of temperature and ground water level.

BACKGROUND OF THE INVENTION

Geothermal heating/cooling systems using heat ground source energy receive the worldwide application.

The problems of enlargement of Earth source exchanger productivity by the way of increasing of heat transfer between ground and heat exchanger liquid are known. From the point of view of maximum heat transfer, vertical exchange geothermal systems are the most studied and the most proposed structures relate to them. U.S. Pat. No. 7,370,488 proposes effective vertical geo-thermal heat exchanging system providing "the transfer of heat energy using coaxial-flow heat exchanging structures installed in the earth for introducing turbulence into the flow of the aqueous-based heat transfer fluid flowing along the outer flow channel"

Patent Application US20110308268 A1 describes a vertical underground exchanger, which comprises an internal cylinder with low heat conductivity (HDPE polymer) and external thin wall stainless steel cylinder with high heat conductivity coaxially installed in a bore. The lower ends of the cylinders have bottoms, the bottom of the internal cylinder has holes for water circulation. The gap between the cylinders is filled by sand. During operation, circulating water from the heat pump flows from the top of the cylinder column through the saturated sand medium in a U-configuration at the desired pump rate. The slow passage of water, coaxial with the thin stainless steel cylinder wall together with the special conductivity characteristics of water saturated sand assures efficient ground to water heat transfer. The improved heat transfer results in greater operating efficiencies for geothermal heating and cooling. However, firstly, the described structure comprising two concentric cylinders with sand filling of gap between them and water entrance and flow through sand in outer cylinder and exit in the inner cylinder really is acceptable for vertical (not horizontal) exchangers only, secondly, water flow through sand due to significant hydraulic resistance requires spending considerable capacity that decreases the system efficiency.

U.S. Pat. No. 6,251,179 proposes for vertical geothermal heat pump systems with high density polyethylene (HDPE) piping with circulating water or water/antifreeze liquid to use thermally conductive cementitious grout for boreholes filling Grout 111. Grout 111 or analogous grouts were proposed for DX (direct exchanger) geothermal systems (U.S. Pat. No. 7,856,839, U.S. Pat. No. 7,938,904) with copper pipes. According to U.S. Pat. No. 6,251,179 heat conductivity of wet Grout 111 is 2.42 W/m*K and dry Grout 111 is 2.16 W/m*K.

The above patents relate to vertical geothermal systems providing good heat transfer between the ground and heat medium. However, vertical systems are considerably more expensive than horizontal geothermal heat exchangers. Besides, vertical boreholes have depth 15-120 m with corresponding disadvantage of deep drillings, considerably complicated installation and maintenance. Vertical drilling can provoke mixing between aquifers of different qualities and to be potential source of contamination. Before application of vertical geothermal system geological survey is required. For drilling of boreholes and mounting of exchanging system special equipment is required. Vertical collectors are used where land area is limited and for larger power installations.

U.S. Pat. No. 7,942,015 describes horizontal underground exchanger based on application of rainfall or other precipitation collecting sump in trench with impermeable member on bottom of the trench for trapping water. The trench is filled with different dimensions particulate material through which heat exchange pipes pass. Unidirectional water permeable layer is located on top of sump, directly under road covering.

The system described in U.S. Pat. No. 7,942,015 has the following shortcomings:

This structure is applicable as geothermal system in regions with significant rainfall and other precipitation.

If impermeable member does not reach the top of sump with the unidirectional water permeable layer, in arid and semiarid regions surrounding dry soil will absorb the water, filling sump will be dried and will have low thermo-conductivity. Using of this system artificially filled with water will require large amount of water consumption.

If impermeable member reaches the top of sump with the unidirectional water permeable layer and "heat exchange pipe is buried approximately 1.5 meters below the surface", sump is located from said depth up to ground surface. Due to increased thermo-conductivity of the sump filling, the temperature inside the sump will not correspond to the temperature at depth of Earth 1.5 meters, but will rise in the summer and fall in winter, i.e. will vary with varying temperature of air and ground surface. However, the main geothermal principle is: ground temperature near the heat exchange pipes must be close to stable in all seasons, time of day, weather, etc. It means that in this system there is no ability for effective using of geothermal energy.

When impermeable member reaches the top of sump without the unidirectional water permeable layer, in addition to temperature instability there is necessity in too much quantity of water that can't be provided in arid and semiarid regions.

Patent EP2418439 describes horizontal geothermal system, in which underground exchanger consists of metal or plastic box in a form of parallelepiped with internal inserts, which form internal cavity inside the box, and the boxes are connected hydraulically in series. All connected inserted boxes are installed in trench. Such construction appears expensive and complicated.

Other systems, which contain underground heat exchangers (but not Geothermal ground-coupled heat exchanger), are known as Pit Thermal Energy Storages (See, for example, Michael Harris "Thermal Energy Storage in Sweden and Denmark", 3.4.4 Pit Thermal Energy Storage (PTES), available on the Internet at lup.lub.lu.se/luur/download?func=downloadFile&recordOId=2174449&fileOId=2174452

PTES is used for storing maximal solar thermal production (in summer). PTES are storages of thermal energy seasonally in large pits, which are usually dug into the ground, lined with an impermeable plastic barrier and filled with water or water with gravel. PTES act like a large accumulator tank and, as a rule, are insulated from ground and air. In summer water in the pit is warmed by heat source. In the winter the thermal energy is extracted by the heat pump and used in the district-heating network. "Properly insulated, the elevated temperature is capable of being maintained from season to season".

Another article (see F. Ochs, W. Heidemann, H. Müller-Steinhagen, H. Koch, "Soil-water pit heat store with direct charging system"
available on the Internet at intraweb.stockton.edu/eyos/energy_studies/content/docs/FINAL_PAPERS/13A-2.pdf considers structures of seasonal thermal storages including pits with water, gravel and saturated soil layers. The pit is insulated from Earth on all sides: from the bottom, walls, and lid. Solar collectors are used as heat source during the day.

Thus, the water in the pit is heated by external heat source (solar water heating panels, power plants), but not by energy of the Earth. Heat exchange with the Earth in this case means the loss of energy, which shortens the storage time of the previously stored heat energy.

U.S. Pat. No. 4,466,256 describes ground-installed coldness storage in a form of a pit with water-soaked soil separated from Earth by impermeable plastic material, wherein a given volume of the water-soaked soil is frozen in winter by passing an air-chilled heat-exchange liquid through tubes buried in this water-soaked soil. Frozen medium is used in summer for cooling. As it is written in the patent, the pit with frozen medium is insulated from the Earth due to "self-insulating effect of melting water which inevitably occurs after initial freezing" (U.S. Pat. No. 4,466,256, column 5, lines 40-42). This self-insulating effect considerably decreases heat exchange process with Earth. Thus, frozen matrix due to "effect to insulate the frozen mass" principally cannot be used in geothermal systems.

Besides, in U.S. Pat. No. 4,466,256 frozen matrix top is located at depth 0.3-0.4 meters, where stable Earth temperature required for geothermal heat exchanger is not provided.

There is one more property of all Pit Thermal Energy Storages, which prevents using of them in geothermal systems. This is a fundamentally for energy storage that decreasing of ratio surface area/volume of pit reduces heat losses. In geothermal systems ratio surface area/volume must be maximal as possible for effective geothermal heat exchange process. Therefore, requirements to the form of pits and geothermal systems are opposite.

Thus, requirement for PTES to minimize energy loss through heat exchange with Earth leads to the fundamental structure differences between two systems—Pit Thermal Energy Storages and Geothermal ground-coupled heat exchanger, Horizontal heat exchangers are the simplest and cheapest for geothermal application. Trenching costs for horizontal loops usually are much lower than well-drilling costs for vertical closed-loops, and there are more contractors with the appropriate equipment and experience.

But the main disadvantages of horizontal systems are larger land area required, dependence of performance on season, rainfall, drought potential (low groundwater levels), especially in sandy soils and elevated areas.

The proposed geothermal horizontal exchanger structures allow to decrease at 2-4 times the required land area and to make possible effective their application in arid and semi-arid climate zones.

SUMMARY OF THE INVENTION

The aim of the proposed invention is creating of not expensive horizontal closed-loop ground-coupled exchanger with several times greater productivity and considerably reduced required pipes length and land area. The aim of the proposed invention also is development of system, which minimizes the major drawbacks of horizontal systems: dependence of productivity on climate, seasons, weather, rainfall, etc. and extends application of horizontal ground-coupled heal exchangers in arid and semi-arid regions, where now they are not applicable.

For realizing above mentioned aim—to reduce the area, occupied by the ground heat exchanger, pipes length and simultaneously to increase the energy transmission, the present invention proposes new closed-loop ground-coupled heat exchanging structures with additional stratum, which has increased thermal conductivity.

The proposed solutions are based on an idea of new structure of horizontal ground-coupled heat exchanger including formation of enlarged thermal conductivity stratum around pipes with the use of cheap available materials (sand, plastic film, water and others) and simple technology. Proposed exchanger is especially effective in arid and semi-arid climate zones.

A horizontal geothermal ground-coupled energy system includes lower ground-coupled underground heat exchanger with one or number conduits with circulating heat transfer liquid and upper heat exchanging system with a pump providing the liquid circulation between upper and lower heat exchangers. Geothermal systems may be applied without and with heat pumps. Depending on the operating temperature the working liquid used in closed underground loops is water or water mixed with antifreeze additive.

The present invention describes a lower exchanger including a special additional intermediate stratum between conduits and Earth, separated from surrounding soil by thin waterproof material from all sides, bottom, walls and top, The stratum is fully located on the entire ground heat exchanger area at depth, which is used know horizontal geothermal systems. As a rule, it is in range 1 m-4 m.

The stratum has such dimensions that its section area exceeds the total cross-sectional area of conduits not less than 20 times, and productivity of the exchanger grows with the stratum sizes. The stratum also contains moist fill material, such as sand with water content close to saturation, and said conduits with heat transfer liquid pass through fill material in this stratum.

The stratum is designed to increase in many times surface area for heat exchanging between liquid in conduits and Earth. The stratum together with conduits forms the new structure of ground-coupled heat exchanger with two operating parts:
 conduits,
 additional intermediate stratum,
which create effective underground energy exchange between three mediums:
 liquid in conduits,
 fill material (moist sand) in the stratum,
 Earth,
 The fill material (sand) inside the stratum is provided with additional water, such that water content of the stratum significantly exceeds water content of soil surrounding the stratum. Waterproof material, separating the stratum from the surrounding soil, prevents penetration of water from said stratum to the surrounding Earth. Sand with additional water content has increased thermal conductivity (about 2.7-2.8 W/(m*K)) in comparison with thermal conductivity of arid, semi-arid and ordinary soil (in limits 0.5-1.5 W/(m*K)). Therefore, structure including the stratum leads to increasing the exchanger efficiency, which is defined as ratio of power transmitted by ground-coupled heat exchanger with stratum (Pwith) and without stratum (Pwithout) (coefficient of efficiency Keff=Pwith/Pwithout).

The inventors mathematically developed formula (equation) for design of optimal stratum configuration and calculation of stratum dimensions. This formula links optimal stratum dimensions with desired coefficient of efficiency. Assuming a value of the desired effectiveness, inventors calculate from the equation the required dimensions of minimal stratum side.

$$Keff = \frac{2\pi + \alpha 0 * d0 * \ln(1.35 d1/d0)/\lambda 2}{2\pi + \alpha 0 * d0 * \ln(d1/d0)/\lambda 1 + 0.3 \alpha 0 * d0/\lambda 2} \quad (1)$$

Wherein d1—dimension of minimal side of the stratum, m, $\lambda 2$—surrounding Earth thermal conductivity. W/(m*K), $\lambda 1$—thermal conductivity of the stratum medium, W/(m*K), d0—diameter of conduit (pipe), m, $\alpha 0$—coefficient of thermal transfer of liquid flow in pipes, W/(m$_2$*K).

The formula is an integral part of the design and construction of the stratum configuration.

For example, under conditions, that in conduit with diameter 40 mm water flow is at the boundary of laminar and turbulent ($\alpha 0 * d0 = 12.8$ W/K*m), surrounding Earth is specific for arid area ($\lambda 2 = 0.5$ W/K*m), and stratum medium is moist sand ($\lambda 1 = 2.8$ W/K*m), the stratum has the following dimensions:

for Keff=2.6 stratum side d1=0.2 m
for Keff=3.1 stratum side d1=0.5 m
for Keff=3.2 stratum side d1=0.7 m It means that in arid and semi-arid climate zone stratum dramatically increases energy extracting from Earth (or transmitted to Earth) by 2.5-3 times in dependence on stratum sizes, thermo-conductivity of surrounding Earth and parameters of pipe with liquid (flow rate and diameter of the pipe).

For semi-arid climate (soil with thermo-conductivity $\lambda 2 = 1.0$ W/K*m) coefficient of efficiency at a size of the stratum side 0.5-0.7 m is Keff=2.0-2.1.

Formula (1) allows calculating the stratum efficiency for different sizes of the stratum at long continuous operation. The coefficient of stratum efficiency for intermittent periodic modes of operation was also investigated by finite elements modeling. This model and investigation results are described below.

The stratum is separated from Earth by thermo-conductive thin waterproof material. Thin rigid polymer material (for example, polyethylene, polypropylene, etc.), thin flexible polymer materials (for example, rubber sheet), polymer films (for example, low or high density polyethylene films, etc.), metal (for example, thin steel sheets with anticorrosion covering) can be used. It is possible to apply a combination of different materials.

The present invention discloses design of the exchanger with stratum, which contains also means to compensate unintended small occasional leaks of water from the stratum.

To add the lost water, stratum is provided with one or more passing through the stratum pipes with closed distal end and perforated in the stratum boundaries. The means may include an additional water tank and the perforated pipes are connected to the tank.

Since water pressure in a tube from the tank to perforated pipes in the stratum borders must be balanced by the soil pressure to the same perforated pipe, the tank is disposed above ground on a corresponding height Htank. The height depends on depth of the perforated pipes location from ground surface Hsoil, specific density of the surrounding soil $\rho$soil, water density $\rho$water, and it is defined by relation:

$H\text{tank} > H\text{soil}*(\rho\text{soil}/\rho\text{water}-1)$

The present invention describes also another solution for compensation of unintended small occasional leaks of water from the stratum. In this case the structure contains moisture sensors located in the stratum filling, measuring water quantity. Perforated pipes are connected through the valve to the water network, and said valve opens at conditions that at least one of said sensors shows moisture of soil inside the stratum less than predetermined value.

The present invention discloses type of stratum fill material. Type of fill material shall be selected as compromise for obtaining maximum heat conductivity, minimum cost of the material, ecologic requirements, convenience of application, etc.

As it is described in the invention, the heat conductive moist sand with water content close to saturation is suitable as fill material. Other fill materials providing in moist state high heat conductivity may be applied too.

Inventors performed computer finite element simulation of proposed exchanger for different dimensions of stratum, different types of surrounding soil, climate conditions and fill materials.

As it is known, water impregnation can increase soils thermal conductivity in several times. [Soil Temperature Changes with Time and Depth, Theory, D. L. Nofziger available on the Internet at soilphysics.okstate.edu/software/SoilTemperature/document.pdf.

This effect is much greater for sandy soils, than for clay or silt, and Inventors considered this feature of soil with rich water content to increase closed-loop exchanger efficiency.

There are in application other materials with high heat conductivity. For example, some patents propose to use in vertical exchangers cementitius grout—Grout 111 (for example, U.S. Pat. No. 6,251,179). But this material is too expensive and not convenient for horizontal exchangers. Besides, value of heat conductivity of Grout 111 (wet Grout 111 is 2.42 W/m*K and dry Grout 111 is 2.16 W/m*K) is lower than heat conductivity of moist sand, which may exceed value 2.8 W/m*K. Sand is cheap, ecologically acceptable, very convenient at installation. Patents U.S. Pat. No. 7,938,904 proposes to add in Grout 111 metal grit, which "comprises at least one metal selected from the group of metals consisting of stainless steel, magnesium, and titanium", that makes the Grout even more expensive.

The present invention shows different types of conduits for heat transfer liquid. Polymer pipes with thin walls, different profiles from thin plastic or metal also may be applied. Profiles may have increased ratio surface/volume, providing more high value of heat transfer between the liquid and stratum filling.

The pipes may be laid in stratum in different ways: linearly, as horizontal or vertical slinky, as horizontal or vertical "waves".

BRIEF DESCRIPTION OF DRAWINGS

Advantages of the present invention will be readily appreciated, as the same becomes better understood by reference to the following detailed description when considered in connection with the accompanying drawings wherein.

DETAILED DESCRIPTION OF INVENTION

Some variants of principal schemes of the proposed horizontal closed-loop ground-coupled heat exchangers, containing one or number of pipes, are shown in FIGS. 1a, 1b, 1c, 1d. As a rule, in horizontal ground heat exchangers pipes are laid in trenches, dug in surrounding soil, but other laying also may be performed, that is not critical for the proposed invention. On FIGS. 1a, 1b, 1c, 1d the pipes 1 are laid in the stratum 2 with increased heat conductivity. The stratum is separated from all sides by thin waterproof material 3 from surrounding soil 4 and backfilling soil 5.

Figure 1A:
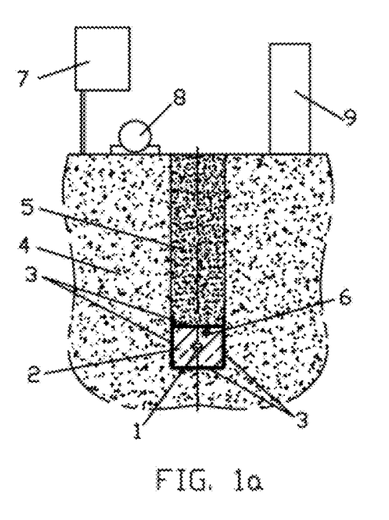
FIG. 1a is view of a scheme of a ground heat exchanger with a linear pipe location in a trench (one pipe in a trench).
Figure 1B:
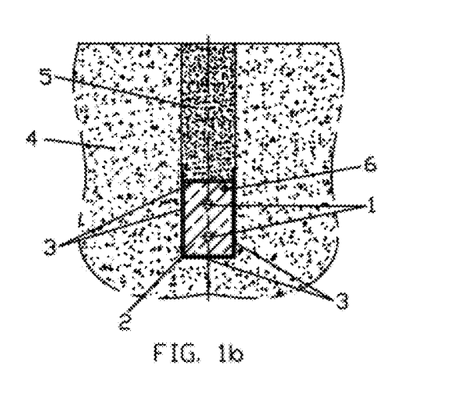
FIG. 1b is view of other scheme of a ground heat exchanger with linear pipes location in a trench (two pipes in a trench in two levels).
Figure 1C:
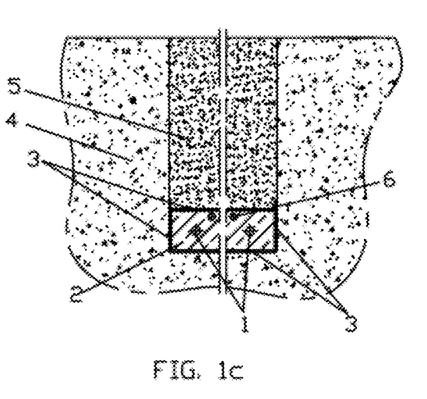
FIG. 1c is other scheme of a ground heat exchanger with linear pipes location in a trench (some pipes in a trench in one level).
Figure 1D:
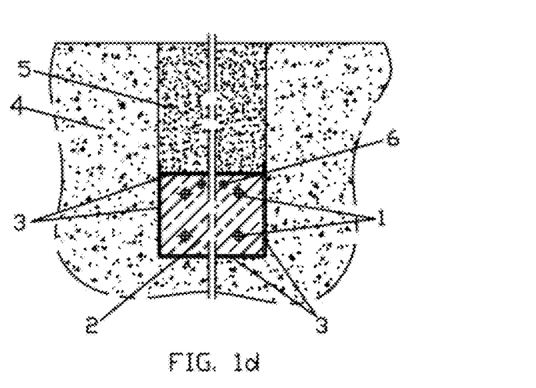
FIG. 1d is a scheme of a ground heat exchanger with linear pipes location in a trench (some pipes in a trench in two levels).

The FIGS. 1a, 1b, 1c, 1d show, as examples, some options for the pipes location: one straight pipe in the stratum (FIG. 1a), two straight pipes in the stratum in two levels (FIG. 1b), some number of pipes in the stratum in one level (FIG. 1c), some number of pipes in the stratum in two levels (FIG. 1d).

For controlling of water content and compensation for unintended small water leaks, the underground stratum 2 has additional pipes 6. To provide uniform water distribution in the stratum, the additional pipes 6 have holes in their walls in borders of the stratum and closed distal ends. Water content in the stratum is provided by water tank 7 located on height $H_{tank}$ producing pressure close to soil pressure on depth of stratum location.

Described ground heat exchanger operates as a part of whole system, including a water circulation pump 8 and an upper aboveground heat exchanger 9.

Figure 2:
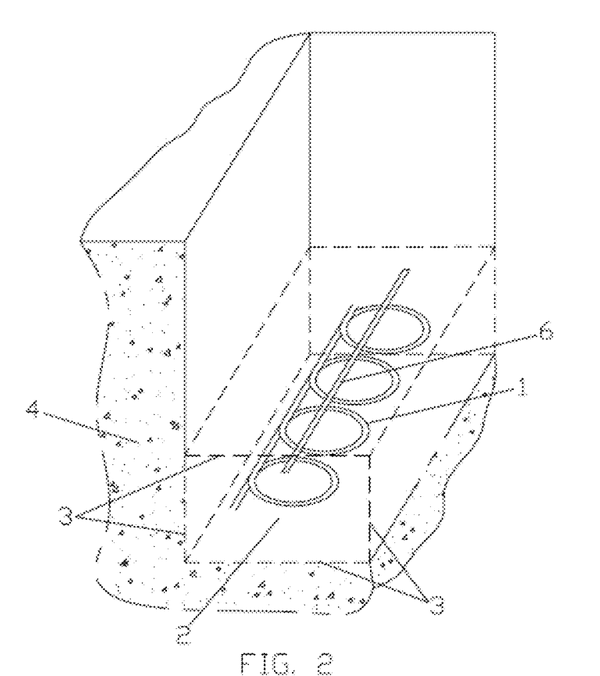
FIG. 2 is a scheme of a ground heat exchanger with horizontal slinky type of pipe location in a trench.

FIG. 2 shows horizontal slinky type of the pipe location in the stratum. For better showing of the exchanger structure the stratum is represented as transparent, and backfilled soil is not shown. There are known also other types of pipes laying (vertical slinky, horizontal and vertical wavy, and others), which can be applied for horizontal ground-coupled heat exchangers according to this invention.

The present invention describes different types of conduits with heat transfer liquid. Polymer pipes with thin walls, different profiles from thin plastic or metal also may be applied. Profiles may have increased ratio surface/volume, providing more high value of heat transfer between the liquid and stratum filling. However, profiles are more expensive.

The pipes may be laid in stratum in different ways: linearly, as horizontal or vertical slinky, as horizontal or vertical "waves".

Figure 3:
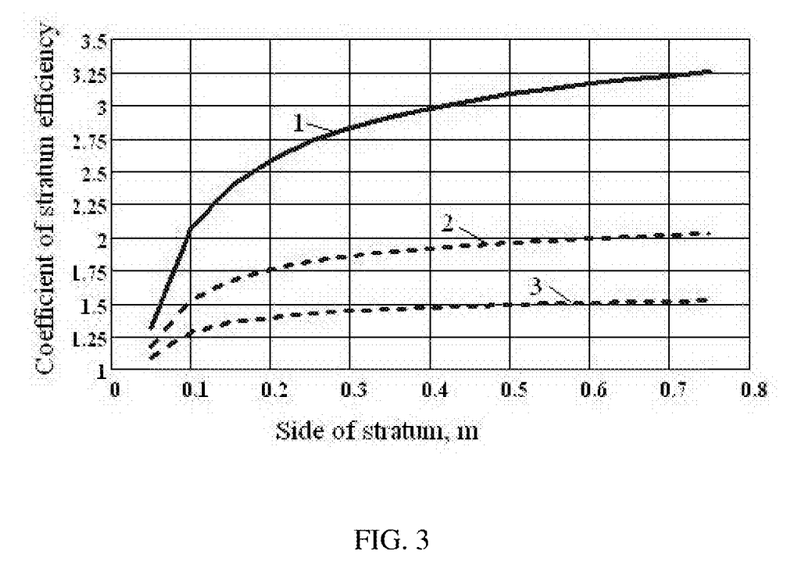
FIG. 3 is graphs of dependence of stratum efficiency coefficient on size of stratum for three types of Earth thermal conductivity.

In order to evaluate the stratum effective dimensions, Inventors performed calculations according to the formula (1). Results are shown in FIG. 3. The calculations are made for exchanger containing straight pipe d0=40 mm, for surrounding ground in arid, semi-arid and middle climate zones (thermal conductivity $\lambda 2$=0.5 W/(m*K), $\lambda 2$=1.0 W/(m*K) and $\lambda 2$=1.5 W/(m*K)). Thermal conductivity of the stratum filling $\lambda 1$=2.8 W/(m*K).

As FIG. 3 shows, the maximum efficiency is reached in arid zone (curve 1). Curve 2 corresponds to thermal conductivity of Earth $\lambda 2$=1.0 W/(m*K), curve 3 corresponds to Earth thermal conductivity $\lambda 2$=1.5 W/(m*K). From the beginning efficiency of the stratum increases rapidly with increasing size of stratum to the value of stratum side 0.2-0.3 m, then growth slows. As Inventors suppose, the most rational sizes of the stratum sides are 0.5-0.6 m per one pipe.

Figure 4A:
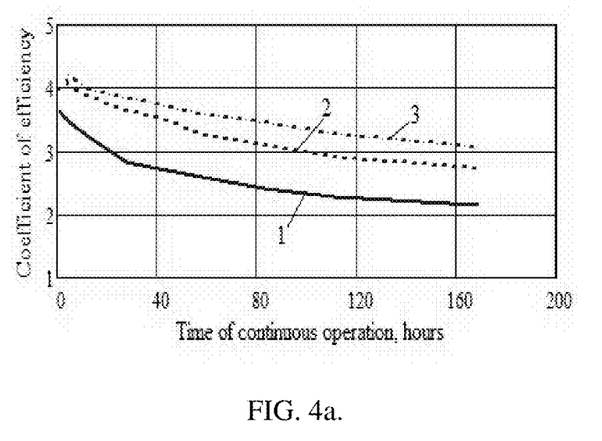
FIG. 4a is graphs of dependence of stratum efficiency coefficient on operating time at three levels of the stratum thickness (200, 500 and 750 mm) for surrounding soil with poor (arid climate) thermal conductivity (0.5 W/m*K)
Figure 4B:
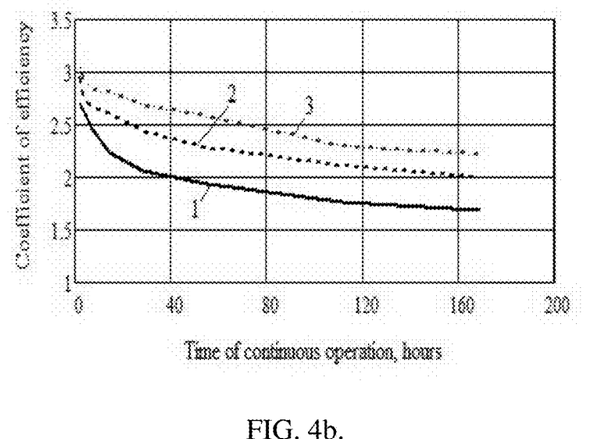
FIG. 4b is graphs of dependence of stratum efficiency coefficient on operating time at three levels of the stratum thickness (200, 500 and 750 mm) for surrounding soil with middle thermal conductivity (1.0 W/m*K).

Finite element simulation for horizontal closed-loop ground-coupled heat exchangers of traditional and new structures was made to estimate efficiency of the proposed decision in dependence on time of continuous operation. The simulation is made for exchanger containing straight pipe d0=40 mm, length 100 m, at basic soils in arid zone ($\lambda$=0.5 W/(m*K)) (FIG. 4a) and semi-arid zone ($\lambda$=1.0 W/(m*K)) (FIG. 4b) thermal conductivity. The special stratum parameters correspond to sand with bulk density 1800 kg/m³ and volume water content 0.25 ($\lambda$=2.8 W/(m*K)).

Three values of stratum thickness were considered: t=200 mm, 500 mm and 750 mm. The results of calculations are shown in graphs of FIG. 4. The curves 1, 2 and 3 correspond to stratum thickness 1—t=200 mm, 2—t=500 mm, 3—t=750 mm. On FIG. 4a, FIG. 4b coefficient of the stratum efficiency is relation of extracted power from a ground heat exchanger with the stratum of the corresponding thickness to extracted power from the known structure without the stratum. As the results show, the stratum radically increases power, which can be transmitted, especially at basic soil with poor conductivity (FIG. 4a) and the stratum thickness not less than 500 mm. Naturally, the stratum application is the most effective for arid regions with poor soil thermal conductivity. For such regions application of the stratum with thickness t≥500 mm in comparing with the structure without it permits to increase the energy exchange by 2-3 times. For regions with semi-arid soil conductivity (FIG. 4b) the resulting output is more than one and a half times that at structure without the stratum. As the graphs show, the proposed decision permits to increase by 1.5-2.5 times the ground source extraction power of the exchanger and correspondently to reduce the required pipe length and land area.

The underground loop must be sized to meet the peak thermal power load. The proposed exchanger structure may fill simply this requirement, because at relatively short-term operation the efficiency of the proposed structure is even higher and reaches increasing by 2.5-4 times in dependence on climate zone.

Figure 5A:
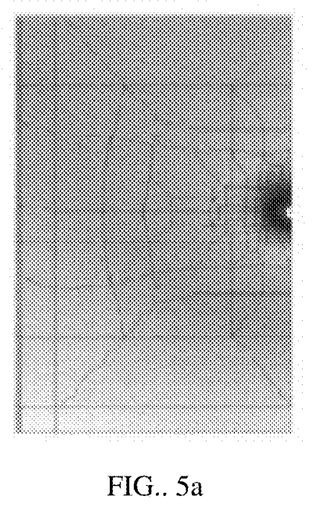
FIG. 5a is temperature distribution after 420 hours of exchanger continuous operation in soils with poor thermal conductivity (0.5 W/m*K) without stratum
Figure 5B:
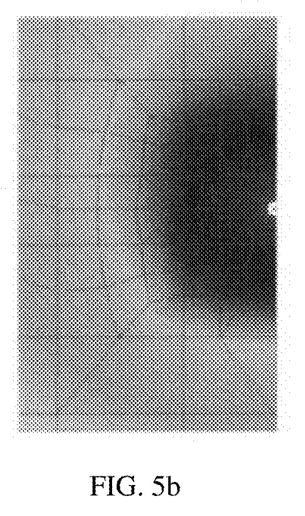
FIG. 5b is temperature distribution after 420 hours of exchanger continuous operation in soils with poor conductivity (0.5 W/m*K) with stratum

FIGS. 5a and 5b show qualitative pictures of temperature distribution near conduit without (5a) and with (5b) stratum, respectively, at continuous operation 420 hours. It is obviously that presence of the stratum leads to dramatic enlargement of the surrounding soil volume involved in heat exchange that resulted impact increase the exchanger efficiency.

At the same time, proposed structure is very cheap and simple in fulfillment.

The invention has been described in an illustrative manner, and it is to be understood that the terminology, which has been used, is intended to be in the nature of words of description rather than of limitation. Clearly, many modifications and variations of the present invention are possible in light of the above teachings. Accordingly, it is to be understood that the invention can practiced otherwise than specifically described.

INDUSTRIAL APPLICABILITY

Proposed Horizontal ground coupled exchangers are applicable in arid and semi-arid regions, which occupies significant part of USA and many other countries areas (http://luna.library.okstate.edu:8180/luna/servlet/detail/OSULibraryOCM~7~7~15537~1 00787). Investigation of proposed exchangers shows that for ground properties, corresponding to arid or semi-arid area, relationship of power, which can be transmitted at proposed structure, to corresponding value at traditional exchanger (coefficient of efficiency) reaches 2-3. Moreover, the ground loop must b sized to meet the peak thermal power load. The proposed exchanger structure may simply meet this requirement because at relatively short-terra the system operation efficiency is even higher (by 2.5-4 times). Performance of the proposed exchanger structure is weaker dependent on the climate factors. Thus, the following properties of the new structure heat exchanger will provide technical impact:

Multiple increase (by 2.5-4 times) of ground energy extracting efficiency.
  Consistent ability to extract energy at any day and season conditions variation.
  Proposed structure is cheap, stable and simple in fulfillment
  Extension of Horizontal ground coupled exchangers in arid and semi-arid regions

The invention claimed is:

1. Horizontal ground-coupled heat exchanger for a geothermal system with a portion of the system disposed underground for exchanging heat from the soil with an above ground portion of the geothermal system, the underground portion of the system comprising;
  a. at least one conduit having a longitudinal axis containing a heat transfer liquid flowing therein;
  b. at least one stratum having a longitudinal axis and a smallest side, said at least one stratum positioned between the at least one conduit and the soil and totally disposed beneath the surface of the soil at a depth from the surface of 1.2-3 m and completely separated on all sides from the surrounding soil by at least two layers of a thin thermo-conductive waterproof material, said waterproof material preventing leakage of water from the at least one stratum into the soil disposed around it, the at least one stratum containing heat conductive fill material comprised of sand substantially saturated with water at a temperature above 0° C., and said at least one conduit is disposed in the fill material below the frost line of the soil; and
  c. means to compensate for small leaks of water from the at least one stratum disposed within the at least one stratum,
  wherein the at least one stratum has dimensions such that its cross-sectional area lying in a plane perpendicularly intersecting the longitudinal axis of the stratum exceeds by not less than a factor of 40 the sum of the cross-sectional areas of all of the conduits within the stratum, the cross-sectional area of each conduit lying in a plane perpendicularly intersecting the respective conduit's longitudinal axis, and
  wherein said at least one stratum having said at least one conduit disposed therein is constructed to have a minimum size d1 for the smallest side per conduit, with the minimum size dependent on a preselected stratum efficiency parameter (Keff) reflective of the average humidity of a region of use and indicative of the dimensionless ratio of the amount of power transmitted by the ground-coupled heat exchanger with a stratum with minimum side d1 relative to the power transmitted by the same heat exchanger without such a stratum, and where d1 is determined by the following relation:

$$d1 = d0 * \exp\left[\frac{(Keff - 1)(2\pi + 0.3 * \alpha 0 * d0/\lambda 2)}{\alpha 0 * d0 * (1/\lambda 2 - Keff/\lambda 1)}\right]$$

where: d1—size of smallest side of the stratum per conduit positioned within the stratum, m, d0—diameter of the conduit with the heat transfer liquid, m, α0—heat transfer coefficient of conduit when filled with the heat transfer liquid, W/(m²*K), λ1, λ2—coefficients of thermo-conductivity of the stratum fill material and the soil surrounding the stratum, W/(m*K), respectively.

2. Horizontal ground-coupled heat exchanger according to claim 1 wherein the at least two layers of thermo-conductive waterproof material are at least two layers of thin rigid polymer material.

3. Horizontal ground-coupled heat exchanger according to claim 1 wherein the at least two layers of thermo-conductive waterproof material are at least two layers of thin flexible polymer material.

4. Horizontal ground-coupled heat exchanger according to claim 1 wherein the at least two layers of thermo-conductive waterproof material are at least two layers of flexible polymer films.

5. Horizontal ground-coupled heat exchanger according to claim 1 wherein the at least two layers of thermo-conductive waterproof material are at least two layers of thin metal.

6. Horizontal ground-coupled heat exchanger according to claim 1 wherein the at least two layers of thermo-conductive waterproof material are a combination of thin metal and polymer material.

7. Horizontal ground-coupled heat exchanger according to claim 1, wherein the at least one stratum further contains at least one pipe passing through the at least one stratum for delivering water to the at least one stratum from a source above the soil, the at least one pipe having a closed distal end within the soil and perforated at locations within the at least one stratum to compensate for small leaks of water from the at least one stratum.

8. Horizontal ground-coupled heat exchanger according to claim 1, wherein the at least one conduit is formed of a flexible polymer material.

9. Horizontal ground-coupled heat exchanger according to claim 1, wherein said at least one conduit has cross sections perpendicular to its longitudinal axis differing in shape from those of a conduit with circular cross-sections perpendicular to its longitudinal axis, the at least one conduit having an external surface area per unit length of the conduit and a surface/volume ratio per unit length of the conduit greater than the same metrics of the conduit with the circular cross-sections when the cross sections of both conduits have the same area, the at least one conduit thereby providing increased heat transfer.

10. Horizontal ground-coupled heat exchanger according to claim 9, wherein the at least one conduit is formed of materials selected from a group consisting of metal conduits or polymer conduits.

11. Horizontal ground-coupled heat exchanger according to claim 1, wherein the at least one conduit for a heat transfer liquid is laid linearly in a trench positioned in the at least one stratum.

12. Horizontal ground-coupled heat exchanger according to claim 1, wherein the at least one conduit for a heat transfer liquid is laid as horizontal waves in a trench positioned in the at least one stratum.

13. Horizontal ground-coupled heat exchanger according to claim 1, wherein the at least one conduit for a heat transfer liquid is laid as vertical waves in a trench positioned in the at least one stratum.

14. Horizontal ground-coupled heat exchanger according to claim 1, wherein the at least one conduit for a heat transfer liquid is laid as a horizontal slinky in a trench positioned in the at least one stratum.

15. Horizontal ground-coupled heat exchanger according to claim 1, wherein the at least one conduit for a heat transfer liquid is laid as a vertical slinky in a trench positioned in the at least one stratum.

16. Horizontal ground-coupled heat exchanger according to claim 1, wherein the maximum value of stratum efficiency parameter Keff is selected as follows: maximum Keff==3.25 for dry climate regions having soil thermal conductivity of about $\lambda 2=0.5$ W/m*K; maximum Keff=2 for semi-dry climate regions having soil thermal conductivity of about $\lambda 2=1.0$ W/m*K; and maximum Keff=1.5 for regions with average relative humidity having soil thermal conductivity of about $\lambda 2=1.5$ W/m*K.

17. Horizontal ground-coupled heat exchanger according to claim 1 further including at least one moisture sensor positioned in the region of the at least one stratum adjacent to the at least one conduit to determine deviations from saturation of the at least one stratum.

18. Horizontal ground-coupled heat exchanger according to claim 17, the at least one moisture sensor is in signal communication with at least one valve controlled to compensate for small leaks of water from said at least one stratum, the at least one valve opening and closing based on signals received from the sensor.

* * * * *